United States Patent
Gasteyer, III

(10) Patent No.: US 12,465,060 B2
(45) Date of Patent: Nov. 11, 2025

(54) APPARATUS AND METHOD FOR CRUST FREEZING

(71) Applicant: Theodore H. Gasteyer, III, Naperville, IL (US)

(72) Inventor: Theodore H. Gasteyer, III, Naperville, IL (US)

(73) Assignee: Praxair Technology, Inc., Danbury, CT (US)

( * ) Notice: Subject to any disclaimer, the term of this patent is extended or adjusted under 35 U.S.C. 154(b) by 332 days.

(21) Appl. No.: 18/062,247

(22) Filed: Dec. 6, 2022

(65) Prior Publication Data
US 2023/0255242 A1    Aug. 17, 2023

Related U.S. Application Data

(60) Provisional application No. 63/301,672, filed on Jan. 21, 2022.

(51) Int. Cl.
| | |
|---|---|
| A23B 2/80 | (2025.01) |
| A23B 2/88 | (2025.01) |
| F25D 3/11 | (2006.01) |
| F25D 25/04 | (2006.01) |

(52) U.S. Cl.
CPC ............ *A23B 2/803* (2025.01); *A23B 2/88* (2025.01); *F25D 3/11* (2013.01); *F25D 25/04* (2013.01)

(58) Field of Classification Search
CPC . F25D 3/11; F25D 3/127; F25D 13/06; F25D 13/062; F25D 13/065; F25D 13/067; F25D 24/04; F25D 25/04; A23B 2/803; A23B 2/88
See application file for complete search history.

(56) References Cited

U.S. PATENT DOCUMENTS

| | | |
|---|---|---|
| 3,045,809 A | 7/1962 | Bechtel, Jr. |
| 3,234,775 A | 2/1966 | Derman |
| 3,333,678 A | 8/1967 | Rodman |
| 3,844,133 A | 10/1974 | Bierley et al. |
| 4,475,351 A | 10/1984 | Klee |
| 5,156,008 A | 10/1992 | Olsson et al. |
| 5,339,651 A | 8/1994 | Breunig et al. |
| 5,467,612 A | 11/1995 | Venetucci |
| 5,520,013 A | 5/1996 | Kuo |
| 5,954,188 A | 9/1999 | Etherington et al. |
| 6,009,719 A | 1/2000 | Ochs |
| 6,148,618 A | 11/2000 | Malmberg et al. |
| 6,242,028 B1 | 6/2001 | Bean |
| 6,408,639 B1 | 6/2002 | Jagaeus |
| 6,825,446 B1 | 11/2004 | Arnarson et al. |
| 7,987,972 B2 | 8/2011 | Hennigar et al. |
| 9,694,979 B2 | 7/2017 | Ulchak et al. |
| 9,739,520 B2 | 8/2017 | Miller et al. |

(Continued)

FOREIGN PATENT DOCUMENTS

| | | |
|---|---|---|
| EP | 2412649 A1 | 2/2012 |
| GB | 2023789 A | 1/1980 |

(Continued)

*Primary Examiner* — Joseph F Trpisovsky
(74) *Attorney, Agent, or Firm* — Andrew G. Melick

(57) ABSTRACT

Disclosed are methodology and apparatus for freezing the exterior crust of products, such as food products, in a manner that does not cause the exterior of the product to adhere to the surface on which it is placed during or after the freezing.

15 Claims, 8 Drawing Sheets

(56) References Cited

U.S. PATENT DOCUMENTS

| | | | |
|---|---|---|---|
| 2007/0169630 A1* | 7/2007 | Auyoung | A21B 1/48 |
| | | | 99/275 |
| 2008/0118618 A1 | 5/2008 | Cheney et al. | |
| 2009/0308263 A1* | 12/2009 | Berghoff | A23L 3/361 |
| | | | 99/476 |
| 2010/0319365 A1* | 12/2010 | Newman | F25D 3/11 |
| | | | 62/380 |
| 2012/0273165 A1 | 11/2012 | McCormick et al. | |
| 2013/0125576 A1* | 5/2013 | Newman | F25D 3/11 |
| | | | 62/380 |
| 2014/0060088 A1 | 3/2014 | Rampersad et al. | |
| 2020/0318894 A1 | 10/2020 | Bureta et al. | |

FOREIGN PATENT DOCUMENTS

| | | |
|---|---|---|
| WO | 2005003657 A1 | 1/2005 |
| WO | 2010091061 A1 | 8/2010 |

\* cited by examiner

APPARATUS AND METHOD FOR CRUST FREEZING

RELATED APPLICATIONS

This application claims the benefit of U.S. Provisional Application Ser. No. 63/301,672, filed on Jan. 21, 2022, which is incorporated herein by reference.

FIELD OF THE INVENTION

The present invention relates to methods of freezing at least an outer surface of part of a product such as a food product, and to apparatus with which the methods can be carried out.

BACKGROUND OF THE INVENTION

In the preparation and processing of a food product, it is often desirable to freeze the food product so that the product can more easily be further processed, packaged, shipped, and stored. Freezing also prolongs the safe life of the product. These considerations are particularly relevant when the food product is a raw product such as a piece of meat such as chicken, beef, turkey, or fish; they are also relevant when the food product is manufactured, such as a manmade mixture of meat with other ingredients, as well as confections and dough-based product.

Many food products to be frozen contain liquid, whether water and/or other liquid. Freezing the product involves freezing at least some of the liquid water in the product. It is often desirable to freeze at least the bottom surface of the product, even before other surfaces of the product are frozen. Freezing a bottom surface of a product often is carried out while the product has been placed on a supporting surface. However, it is often found that freezing the bottom surface of the product results in the product being frozen to the supporting surface, that is, the surface of the product in contact with the supporting surface is attached to the supporting surface. Then, attempting to remove the product from the supporting surface results in the product being torn from the supporting surface with bits of the product remaining attached to the supporting surface. This is encountered whether the supporting surface is an open mesh formed by intersecting wires, with many openings present between adjacent wires, or is a less porous or non-porous solid surface. Such a result is undesirable because it represents waste of valuable portions of the food product, it damages the surface appearance of the food product which reduces the attractiveness of the product to potential purchasers, and because it creates an unsanitary situation on the supporting surface which must be resolved by frequently cleaning the bits of the product from the surface.

The present invention provides methods and apparatus that can be employed to provide a frozen surface to a food product, also known as crust freezing, without encountering adhesion of the food product to the supporting surface with which the food product is in contact.

BRIEF SUMMARY OF THE INVENTION

One aspect of the present invention is a method of freezing the bottom surface of a food product, comprising placing the food product onto the upper portion of a movable endless conveyor belt having edges oriented in the direction of movement of the belt, said upper portion having a top surface and a bottom surface, wherein the belt is comprised of separate plates each of which is a unitary piece of metal having a thermal conductivity of 2.5 Btu/(Hr-Ft-F)] to 15 [Btu/(Hr-Ft-F)] and a heat capacity of 0.02 Btu/(Lb-F) to 0.19 Btu/(Lb-F) (where, throughout this disclosure, F when it appears in an expression of units stands for degrees Fahrenheit and Ft stands for feet) and each of which extends across the belt from one of its edges to the other edge, and each of which extends across the belt from one of its edges to the other edge, wherein each plate has a top surface which is flat and a bottom surface, and the top surfaces of said plates form together said top surface of the belt;

wherein at least 90% of the surface area of the food product that is within the outermost circumference of the food product which is in contact with the top surface of the conveyor belt is in contact with said top surface; and moving the conveyor belt with the food product on the conveyor belt through an enclosure while applying cryogen in the enclosure to withdraw heat from the food product and from the belt and freeze the surface of the food product that is in contact with the top surface of the belt without freezing said surface of the food product to the top surface of the belt.

Another aspect of the present invention is a freezer comprising an enclosure having an inlet and an outlet;

a movable endless conveyor belt including an upper portion extending through said enclosure from said inlet to said outlet, the belt also including a return portion extending through said enclosure from said outlet to said inlet and defining a return space between said upper portion and said return portion, the belt having parallel first and second edges oriented in the direction of movement of the belt;

wherein the upper portion of the belt has a top surface between said first and second edges and has a bottom surface on the side of the belt that is opposite from the top surface;

wherein the belt is comprised of a plurality of separate plates each of which is a unitary piece of metal having a thermal conductivity of 2.5 Btu/(Hr-Ft-F)] to 15 [Btu/(Hr-Ft-F)] and a heat capacity of 0.02 Btu/(Lb-F) to 0.19 Btu/(Lb-F) and each of which extends across the belt from one of said edges to the other edge, wherein each plate has a top surface and a bottom surface and front, rear, and side surfaces that connect the top and bottom surfaces to each other, and wherein the top surfaces of adjacent plates form together said top surface of the belt;

wherein a plurality of pairs of adjacent plates are in contact with each other or are separated by a gap that is no larger than 10% of the combined distance across the top surfaces of both of said adjacent plates measured in the direction of movement of the belt;

the freezer also comprising upper outlets within the enclosure above the upper portion of the belt which are oriented to discharge cryogen into said enclosure.

As used herein, "cryogen" means a substance which is in its gaseous, liquid, or solid state, which is gaseous at 76 degrees F. and 1 atmosphere pressure, and which is at a temperature less than 32 degrees F. Preferred cryogens include liquid nitrogen, liquid carbon dioxide, and solid carbon dioxide "snow".

As used herein, "crust freezing" means freezing at least one surface of a product.

DETAILED DESCRIPTION OF THE INVENTION

Suitable food products that can be treated by the methodology and apparatus of the present invention include any product that has a solid component and that also has liquid in and/or on the product. Examples include meat (such as beef, poultry, fish, pork) and vegetables and mixtures thereof. Suitable food products include products that are raw (that is, derived directly from their natural sources) and products that are manually prepared such as mixtures of raw materials, and products that are uncooked or that have been partially or completely cooked.

Figure 1A:
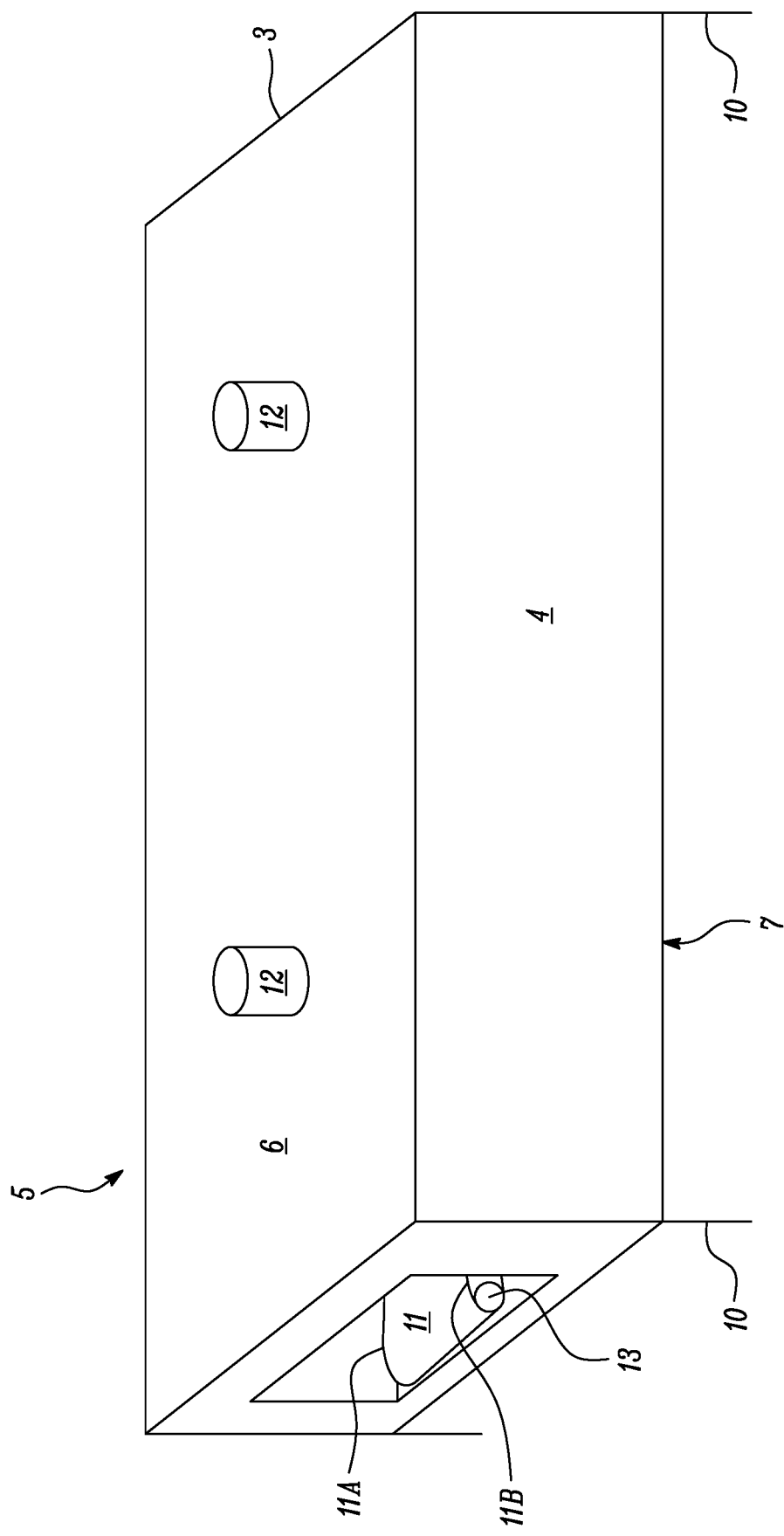
FIG. 1A is a perspective view of the exterior of one type of freezer with which the present invention can be carried out.
Figure 1B:
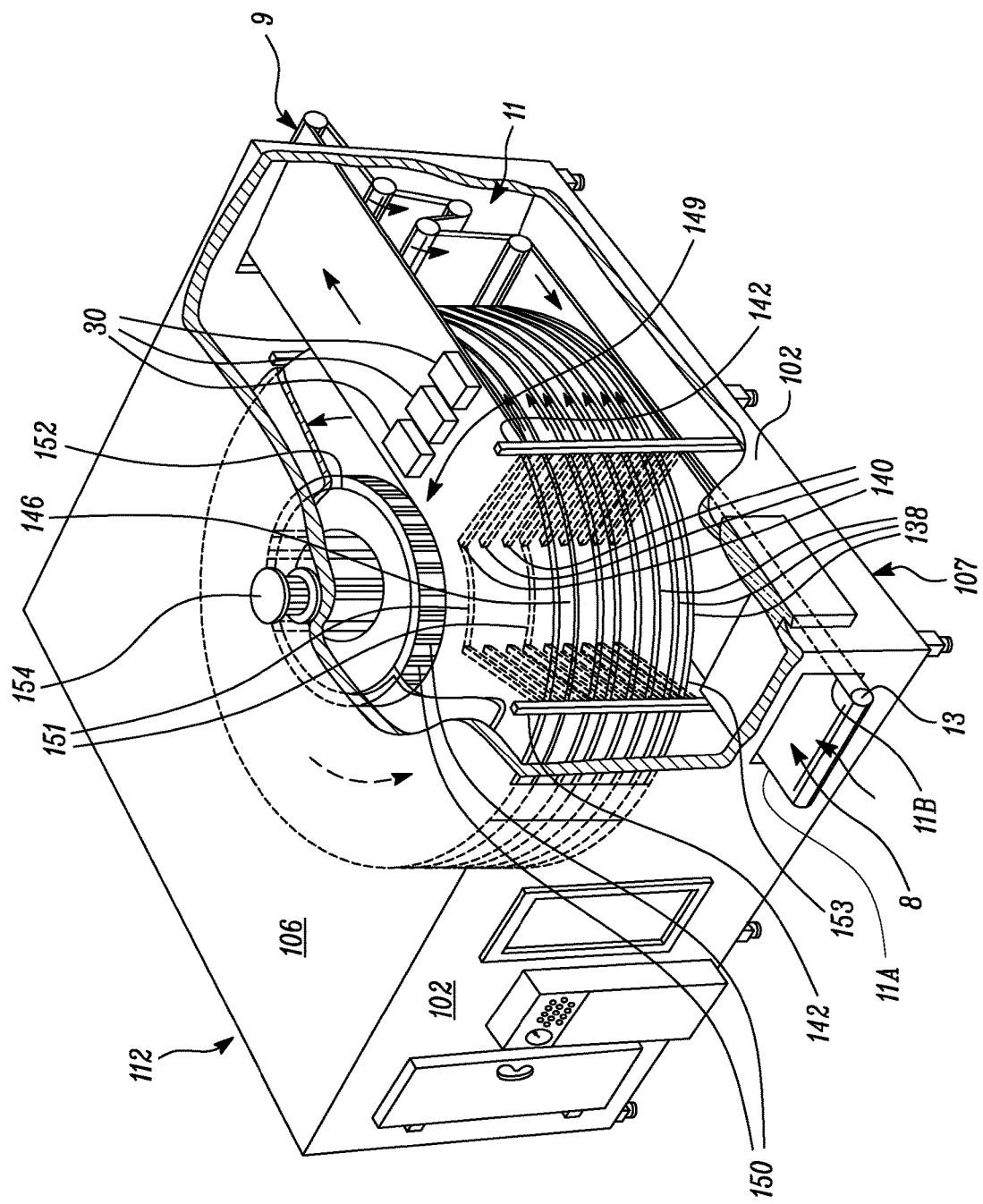
FIG. 1B is a perspective view in partial cutaway of another type of freezer with which the present invention can be carried out.

The present invention can be carried out in freezers of many different types. FIGS. 1A, 1B and 1C provide views of one type of freezer, often referred to as a tunnel freezer, in which the present invention can be carried out.

FIG. 1A depicts freezer 1, which in this embodiment is a generally rectangular metal six-sided structure having first end 2, second end 3 (which is concealed from view in FIG. 1A), first side 4, second side 5 (which is concealed from view in FIG. 1A), top 6, and bottom 7. First opening 8, which will be referred to as an inlet into the interior of freezer 1, is provided in first end 2. Conveyor belt 11 is inside freezer 1 and extends from first opening 8 to second opening 9. Belt 11 has edges 11A and 11B which are generally parallel to each other, One end of conveyor belt 11 can be seen in first opening 8. The depicted freezer 1 is supported on legs 10. In top 6 are positioned motors 12 which drive fans that are shown in FIGS. 2A and 3A.

Figure 2A:
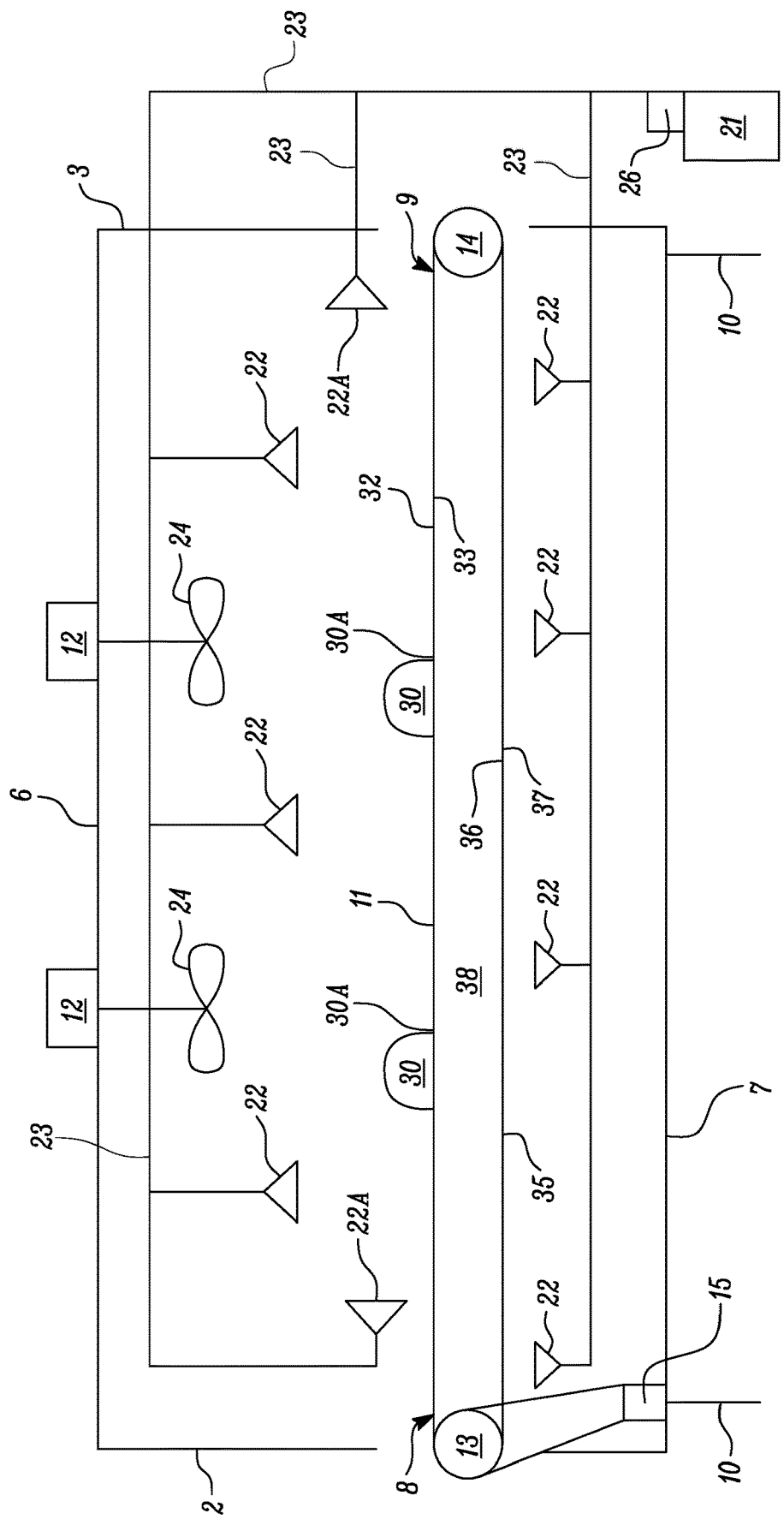
FIG. 2A is a side cross-sectional view of the interior of a freezer of the type shown in FIG. 1A.
Figure 3A:
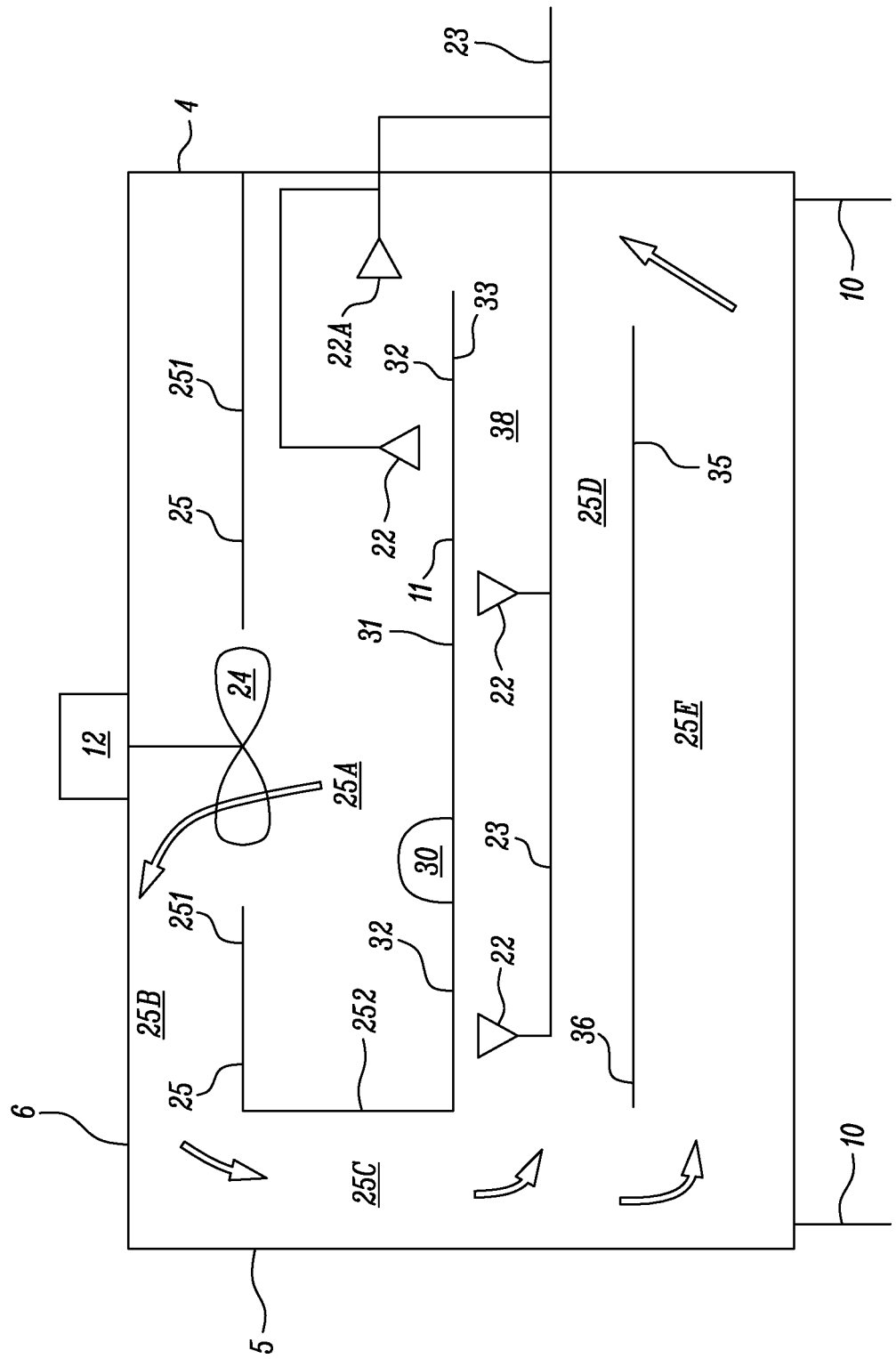
FIG. 3A is an end-on cross-sectional view of the interior of a freezer of the type shown in FIG. 1A.

FIG. 2A depicts the interior of the embodiment of freezer 1 that is seen in FIG. 1A, seen looking into the interior of freezer 1 from one side of freezer 1. As shown in FIG. 2A, conveyor belt 11 passes over rollers 13 and 14 and extends through freezer 1 between first opening 8 and second opening 9. Conveyor belt 11 includes upper portion 31, which comprises top surface 32 of upper portion 31 and bottom surface 33 of upper portion 31. Conveyor belt 11 also includes return portion 35, which comprises top surface 36 of return portion 35 and bottom surface 37 of return portion 35. Return space 38 is between upper portion 31 and return portion 35.

Motion of conveyor belt 11 is provided and controlled by motor 15 or other equivalent drive machinery which together with conventional controls for the motor are operatively linked to belt 11 in any known conventional manner. Conveyor belt 11, when in motion, carries food products shown as 30 on the top surface 32 of upper portion 31 of belt 11.

Food products 30 are carried between first opening 8 and second opening 9. The direction in which the food products 30 are carried is chosen by the operator.

Still referring to FIG. 2A, source 21 of cryogen, which may be a tank or a truck or other container that holds the cryogen, feeds cryogen through line or lines 23 to outlets or nozzles 22 and/or 22A from which cryogen is emitted into the atmosphere in the interior of freezer 1. The flow of cryogen (that is, whether cryogen flows or is shut off, and the volume flow rate of the cryogen) from supply 21 to nozzles 22 and 22A is controlled by conventional meters and valves familiar in this field and indicated as 26.

The nozzles 22 and 22A are located so as to provide satisfactory cooling performance, as described herein. As shown, nozzles 22 should preferably be located to emit cryogen toward and onto top surface 32 of belt 11 and thus onto food products 30 which are on top surface 32. In addition, as shown in FIG. 2A, other nozzles 22 can be located to emit cryogen toward and into contact with bottom surface 33 of the upper portion of belt 11, and preferably also toward and into contact with bottom surface 37 of the return portion 35 of belt 11. Optionally, nozzles 22A can be provided which emit cryogen in a direction parallel to the surface of belt 11 (in a direction parallel to the direction of movement of the belt, or transverse to the direction of movement of the belt) instead of toward belt 11.

One or more fans 24 are provided to impel the flow of the gaseous atmosphere within freezer 1, which contains gaseous cryogen, through a desired flow path which is described herein. Fans 24 are driven by the aforementioned motors 12.

FIG. 3A depicts the interior of the freezer 1 of FIGS. 1A and 2A, viewed as looking into the interior of freezer 1 from end 2. Elements of the freezer that are depicted and that have reference numerals in FIG. 3A that also appear in FIG. 2A have the same description as is provided herein with respect to FIG. 2A.

FIG. 3A includes arrows which illustrate a preferred flow path that the gaseous atmosphere including gaseous cryogen follows within freezer 1 under the influence of the fans 24. One preferred flow path is from the region 25A above the belt 11, through the fans 24, then through space 25B above fans 24, then through region 25C outside an outer edge of belt 11, then through return region 25D between the upper portion 31 and the return portion 35 of belt 11, and then back into region 25A. Another preferred flow path is also from the region 25A through the fans 24, through space 25B above the fans 24, then through the region 25C into region 25E below the return portion 35 of belt 11, and then back into region 25A. Preferably, region 25C extends in the space outside an outer edge of belt 11, between that edge and the closest side of the freezer (which is side 5 in FIG. 3A), so that no part of belt 11 is present in region 25C. As alternative flow paths to the flow paths that are illustrated by the arrows in FIG. 3A, the direction of rotation of fans 24 that establish the flow paths that are illustrated by the arrows can be reversed, in which case the flow paths would conform to the arrows in FIG. 3A if the head on each arrow was moved to the opposite end of the arrow.

FIG. 3A also depicts optional but preferred partition 25 within the interior of freezer 1. Partition 25 is a barrier, such as sheet metal, which defines the aforementioned flow paths for the gaseous atmosphere to follow under the influence of the fans 24 when fans 24 are operating. The barrier is preferably solid but may have a few minor openings through it. Partition 25 preferably includes horizontal components 251 that separate region 25A from region 25B. Preferably, the horizontal components 251 lie in the plane of the blades of fans 24. Partition 25 preferably also includes a component 252 that separates region 25C from region 25A, and separates region 25C from belt 11 so that belt 11 is only on the side of partition component 252 that is not between an edge of belt 11 and side 5.

Figure 2B:
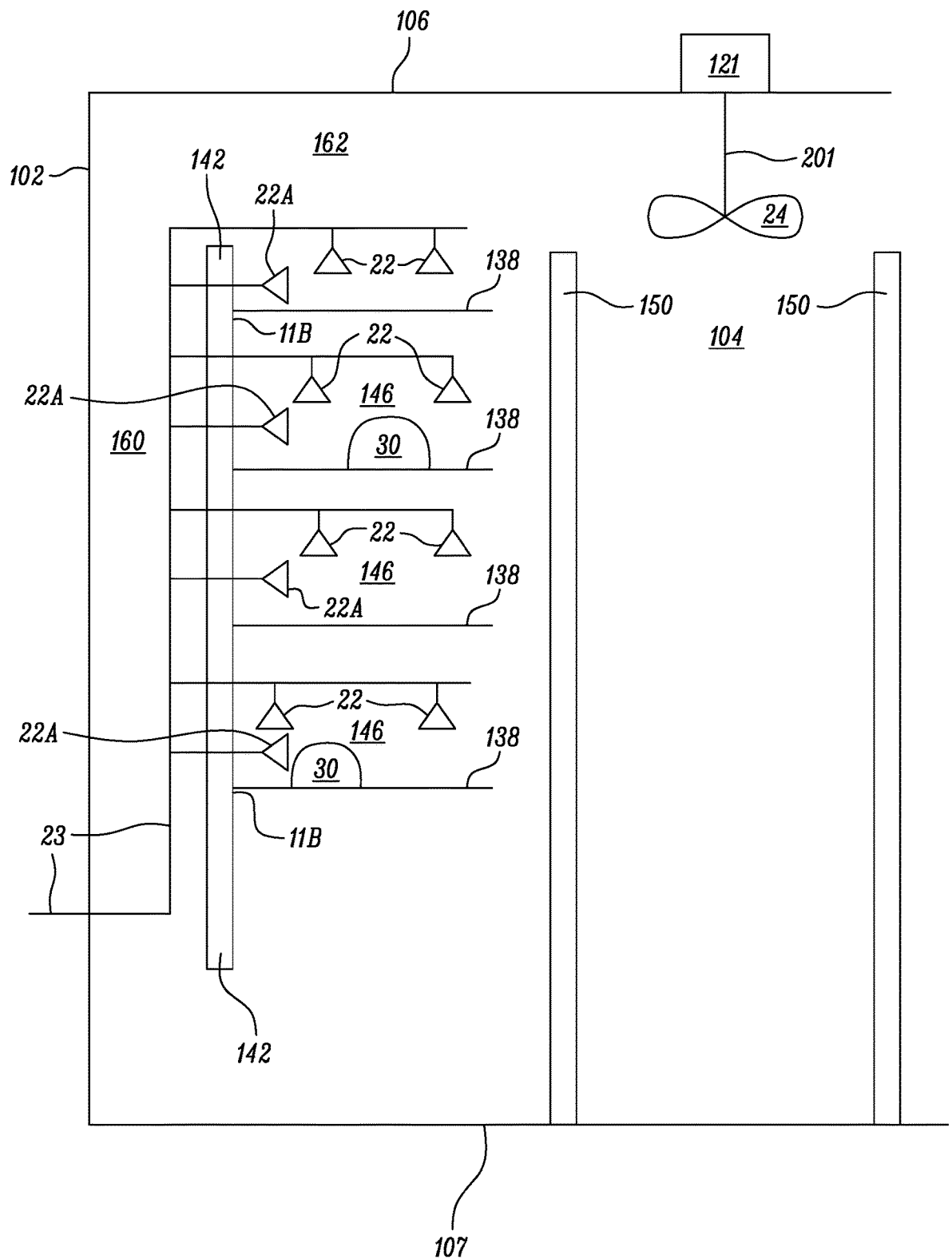
FIG. 2B is a side cross-sectional view of the interior of a freezer of the type shown in FIG. 1B.

FIGS. 1B and 2B depict embodiments of another type of freezer with which the present invention can be carried out, in which the belt 11 follows a generally helical path. This type of freezer is referred to as a spiral freezer or helical freezer.

The device generally comprises unit 10 comprising a housing 112, and an endless movable belt 11 that carries products 30 through housing 112.

Housing 112 can take the form of a rectangular parallelepiped having vertical side walls 102, a top wall 106, and a bottom wall 107, all of which are preferably sealed together and thermally insulated against heat flow therethrough into or out of the interior of housing 112.

The products 30 to be cooled or frozen are conveyed through housing 112 on endless belt 11 which has the structure and characteristics described herein for the present invention.

Housing 112 includes a first opening 8 through a wall 102, and a second opening 9 through the same or another wall 102. Product 30 can be placed on belt 11 at one of openings 8 or 9, and removed from belt 11 at the other opening. The belt 11 extends between openings 8 and 9. As seen in FIG. 1B, one of the openings 8 and 9 is located at a relatively low elevation, such as at about the same level as the lower end of the helix formed by the belt, and the other of these openings is at a relatively high level at the upper end of the helix. Product can pass from low to high, or from high to low. A small number of products 30 are shown in FIG. 1B, for purposes of illustration, but in actual practice the belt 11 could be carrying a much higher number of products.

The belt 11 is driven through its path in any manner by suitable equipment. A preferred type of equipment employs a cylindrical cage 149 which typically comprises a plurality of vertical bars 150 which are spaced apart from each so that the cold atmosphere can flow between the bars. The bars 150 are arrayed in the form of a cylinder and are attached to circular rolled angles at the top (shown as 152) and the bottom and located around the outermost circumference of the open central space 104 which is in the center of the helix formed by the stacked tiers 138 of belt 11 (see also FIG. 2B). The outer surfaces of the bars 150 of cage 149 frictionally engage the interior edges 11A of the belt 11 in the helix. The cage 149 is rotated about its longitudinal (vertical) axis via a motor 154 which is connected by suitable linkage to the cage, and the rotation of the cage frictionally engages the edge 11A of belt 11 and causes the belt 11 to move through its path. A fuller description of this type of equipment appears in U.S. Pat. No. 4,953,365. The belt 11 can alternatively be moved through its path by any other suitable equipment, such as the combination of a roller or pulley over which the belt passes and that engages the belt (such as by friction or by engagement of teeth on the roller with the belt material), and a motor and suitable connecting linkage by which the motor turns the roller or pulley and thereby causes the belt to move.

The path of belt 11 as shown in FIG. 1B extends within the housing 112 from first opening 8 over roller 13 and then upward about a generally helical path thereby defining a plurality of tiers 138 and defining spaces 146 between each pair of adjacent tiers 138. As seen in FIG. 2B, the tiers 138 are supported by a plurality of horizontal arms 140 which extend inward transversely and preferably radially inward from vertical posts 142 that are affixed within housing 112. Circumferential support beams (some of which are shown as 151 and 153) are attached to the inner and outer ends, respectively, of the arms 140, and have curvature corresponding to that of the inner and outer edges 11A and 11B of the belt 11 so that the inner and outer edges of the belt are supported by and slide on the upper surfaces of support beams 151 and 153. Other arrangements for structure that supports the belt and permits it to move are also known and can be employed, so long as they support the belt in the desired path and permit it to move along the path (such as with the aid of rollers or roller bars on the arms 140).

A fan 24 or equivalent impeller is positioned in central space 104 and includes shaft 201 which is attached to motor 121 that, when operating, rotates shaft 201. Referring to FIG. 2B, the housing 112 and the belt 11 are dimensioned to provide lateral circulation spaces 160 between the outward edge 11B of the belt 11 in the helix and the interior surfaces of walls 102. The housing 112 is furthermore dimensioned to provide top circulation space 162 between the topmost tier of the belt and the interior surface of top wall 106.

Referring still to FIG. 2B, liquid cryogen such as liquid nitrogen is fed under pressure from source 21 (not shown) through line(s) 22 to nozzles 22 and/or 22A in the interior of housing 112 and is sprayed toward belt 11 (as shown in FIG. 2B in the case that nozzles oriented as 22 are used) or across belt 11 (as shown in FIG. 2C in the case that nozzles oriented as 22A are used). As is the case with tunnel freezers, the invention can be practiced only with nozzles oriented as at 22 to spray onto belt 11, or only with nozzles oriented as at 22A to spray across belt 11, or with a combination of both types of nozzles. Vaporization of the injected cryogen withdraws heat and provides a very cold gaseous heat transfer medium.

Figure 4:
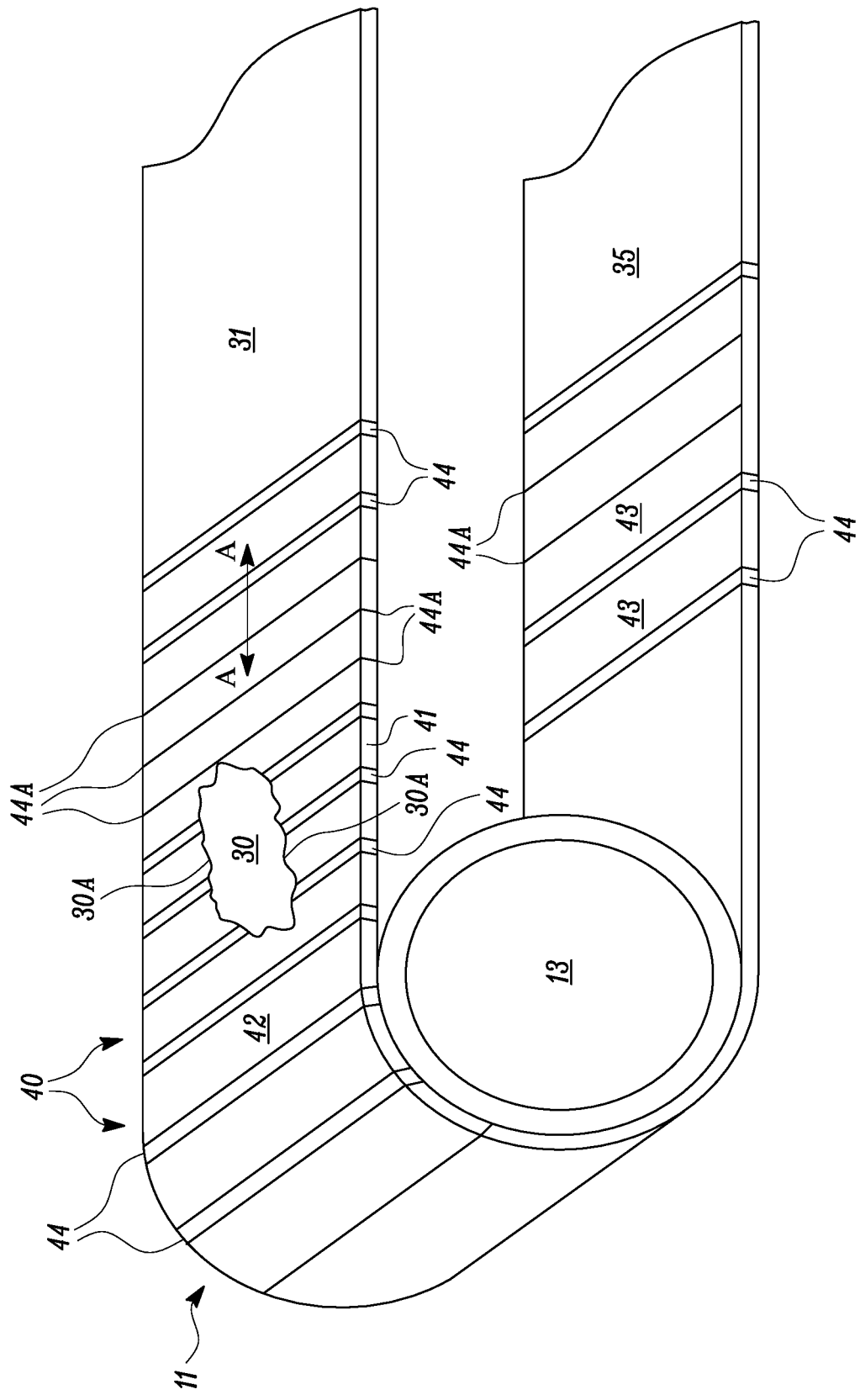
FIG. 4 is a perspective view of a portion of a belt, comprising several plates, with which the present invention can be carried out.

FIG. 4 depicts a portion of conveyor belt 11, at the end where belt 11 passes over aforementioned roller 13. Belt 11 is comprised of plates 40. Each plate 40 extends across belt 11 between opposing sides 41, from one side 41 to the other opposing side 41. The plates 40 are preferably attached at their sides 41 to a drive chain (not shown) which maintains spacing between adjacent plates and which is engaged with the aforementioned drive mechanism and motor 15 to controllably move the conveyor belt 11.

Plates 40 should be made of metal having a thermal conductivity of 2.5 Btu/(Hr-Ft-F)] to 15 [Btu/(Hr-Ft-F)] and preferably 6.5 Btu/(Hr-Ft-F)] to 12 [Btu/(Hr-Ft-F)]. and having a heat capacity of 0.02 Btu/(Lb-F) to 0.19 Btu/(Lb-F) and preferably 0.07 Btu/(Lb-F) to 0.15 Btu/(Lb-F). Examples of suitable material having these characteristics include stainless steel, and Inconel.

Each plate 40 is preferably unitary (that is, in one piece) and is solid throughout but may have a hollow inner cavity to lessen the weight while retaining strength and rigidity.

Each plate 40 has a top surface 42 and a bottom surface 43. The upper portion 31 of belt 11 is a flat coplanar surface 32 comprised of the top surfaces 42 of one or more adjacent plates 40 (as illustrated in FIG. 4). Each pair of adjacent plates 40 can be separated by an open space shown as gap 44, to permit the belt to curve around rollers 13 and 14 when it is in motion. Alternatively, some pairs of adjacent plates may touch each other, as shown as 44A in FIG. 4, in which case there is no gap 44.

When a piece 30 of food product has been placed on the plate, the portion of the piece of food product that is in contact with the top surface 42 of one or more plates is determined, for purposes of the description of practice of this invention, as follows. When a piece of food product is placed on the plate, some of that piece will of course be in contact with the plate; the outermost circumference of the piece that is in contact with the plate (shown as 30A in FIG. 4) is measured, and the "total surface area" within (that is, bounded by) that outermost circumference is calculated. Then, the "aggregate surface area", which is the surface area of the top surface of the upper portion of the belt that is within that same outermost circumference is measured, but taking into account only the parts of that top surface where a plate surface is present (that is, omitting from this measurement the surface area within the circumference that is occupied by one or more of the aforementioned gaps 44). Then, the portion of the piece of food product that is in contact with the top surface 42 is calculated by dividing that "aggregate surface area" by the "total surface area". Preferably, the gaps 44 are dimensioned so that the result of dividing the "aggregate surface area" by the "total surface area" is at least 90% and preferably at least 95%, which can be up to 100% which is the ratio when an entire piece of food product 30 rests on one plate and not on any gap 44.

Another preferred manner for determining the dimensions of gaps 44 that may be present is to measure the distance across all of the top surfaces of two adjacent plates, measured in the direction of movement of the belt (which is along arrow A-A that appears in FIG. 4), and to provide that the gap 44 between those two adjacent plates is no more than 10%, and preferably no more than 5%, of that combined distance.

Preferably, each plate 40 is in the shape of a rectangular prism, by which is meant a shape that is comprised of six planar rectangular surfaces arranged as three pairs of opposed parallel surfaces, wherein the edges of surfaces that contact each other form angles of ninety degrees. Also preferably, one or more of the plates are in the shape of rectangular prisms from which a segment 45 extends out of one of the planes that comprise the front, rear, or bottom, of the rectangular prism. Segments 45 having these characteristics are preferably on a majority of the plates in a belt, and more preferably on all of the plates in a belt.

Figure 5:
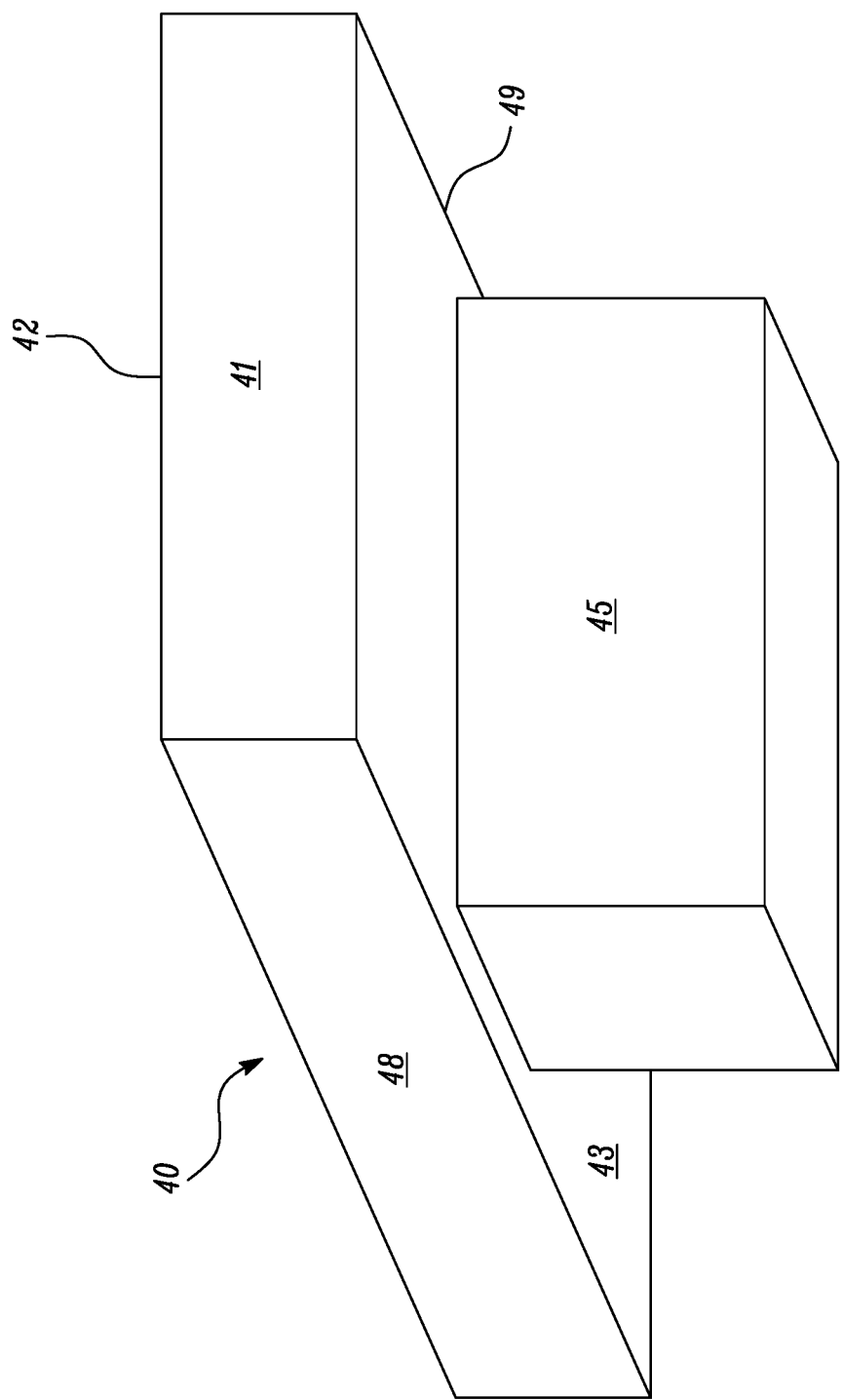
FIG. 5 is a perspective view of an embodiment of a plate, with which the present invention can be carried out.
Figure 6:
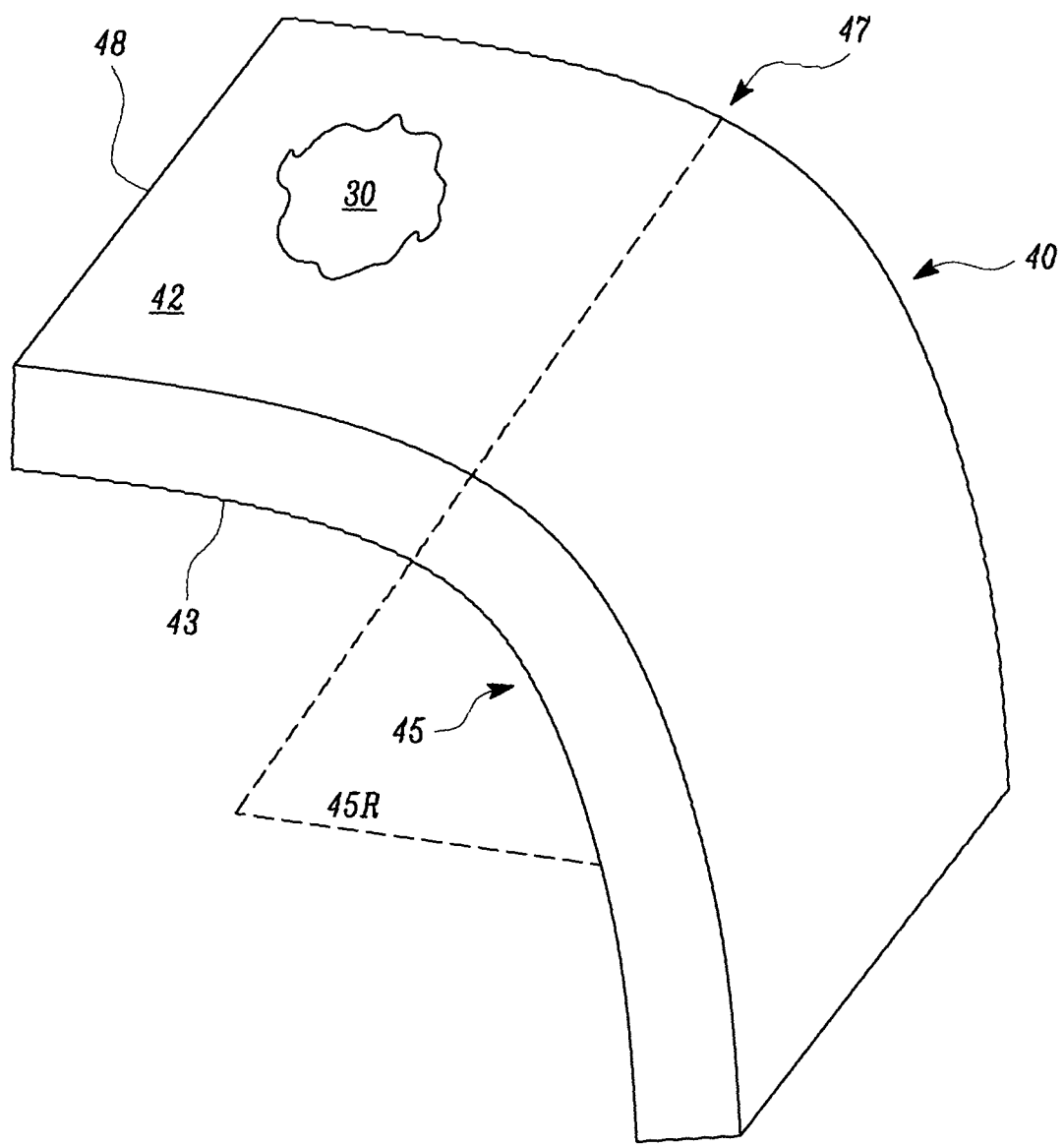
FIG. 6 is a perspective view of another embodiment of a plate with which the present invention can be carried out.

Examples of these segments 45 are seen in more detail in FIGS. 5 and 6. In FIG. 5, the plate 40 is in the form of a rectangular prism that is formed by top 42, bottom 43, front 48, rear 49, and sides 41. Segment 45 in FIG. 5 extends downward from the center of the bottom surface 43 of plate 40. When a segment 45 to be provided is as shown in FIG. 5, there should be a cavity in each roller 13 and 14 (or rollers 13 and 14 should be split), so that each segment 45 can pass through the rollers or between separated split portions of each roller.

In FIG. 6, segment 45 extends downward from the front of plate 40, out of the plane of the bottom surface 43 of plate 40. When a segment to be provided is as shown in FIG. 6, adjacent plates should be spaced apart sufficiently that the segment 45 on one plate does not contact the adjacent plate when the belt curves around rollers 13 and 14.

The segment 45 shown in FIG. 6 preferably extends all the way across the plate, from one side or edge 41 to the other side or edge 41, the better to provide stiffness to the plate as well as providing additional heat capacity (by virtue of the added mass) and providing each plate with additional surface area for convective heat transfer. The segments 45 shown in FIG. 6 preferably curve through a smooth radius 45R that is important in keeping the plate 40 straight and in helping the plates 40 to not catch on a scrapper bar if one is present at the exit of the freezer.

The thickness of the plates 40 is typically between 18-14 gage (0.048 to 0.075 in). The plates are welded or otherwise attached to the drive chains or belt structure. Their sides 41 have a gap from greater than 0 to about $\frac{1}{16}$ in between the trailing edge of a plate and the leading edge of the next adjacent plate. If needed, the trailing edge of a plate 40 can be beveled at an angle and the horizontal length extended to nearly touch the radius section of the plate 40 behind it. This provides a belt with almost zero gap between each plate and could be suitable for semi liquid products or products or where nearly zero belt marks are needed. This belt design forms a mostly flat flexible metal conveyor surface that is ideal for crust freezing the bottom of food products when operated at low temperatures.

In operation of the present invention, one or more pieces of food product 30 are placed on the top surface of the upper portion of the belt 11 described herein, and the belt carrying the food product is moved through the freezer. When a conveyor belt is cooled to a low temperature inside a freezer and a warm product is placed on the belt, heat will quickly flow from the warm product into the plate and the bottom surface of the product can be very quickly frozen due to this contact. Belts with a plate design described herein are much heavier than traditional conveyor belts due to the added flat plates. This additional weight provides a capacity for contact refrigeration not available in lighter belts. The total belt weight in accordance with the present invention is preferably in the range of 3 to 7 pounds per square foot, and preferably (with 14 gauge plates and 42 in wide) about 5 pounds per square foot. Since the primary bottom cooling mode for these belts is through conduction heat transfer, only the portion of the belt in close contact with the food will be active in cooling the food. This is typically only the weight of the plates. The drive chain and connecting rods are part of the total belt weight but do not contribute meaningfully to the cooling of products placed on the plates. The belt weight in direct contact with the food would be the weight of the plates or structures that is actually in contact with the piece of food. For tunnel-type freezers, the belt weight in food contact is preferably 2 to 5 pounds per square foot, preferably on the order of about 3.6 pounds per square foot. For spiral-type freezers, the belt weight in food contact is preferably 1.5 to 3 pounds per square foot, preferably on the order of about 2.2 pounds per square foot.

Belts in accordance with this invention can have some open area to allow passage of a cooling fluid through the belt. This open area reduces the area of contact between the food and the belt.

A characteristic that is useful in characterizing equipment and methodology of the present invention is the "conduction cooling factor", which is defined as the "belt weight in food contact" times the "belt % contact area". When a food product is placed in direct contact with a metallic structure that has been cooled to a much lower temperature heat immediately begins to flow from the warmer food into the colder structure. The metallic structure begins to warm up due to its mass and heat capacity. The surface of the food product is cooled as heat flows out of the warmer food into the metallic structure. The metallic structure acts as a heat sink for heat flowing out of the food. The amount of heat that the structure absorbs is the mass times the specific heat times the temperature change in the structure. The amount of heat that flow from the food to the metallic structure depends on two things. First, the mass of the structure is a determining factor in how much heat can be absorbed. Structures with higher mass or weight can absorb more heat for a specified temperature difference. Thus, conveyor belts that have higher weight densities in pounds per square foot will be able to absorb more heat from food products placed on them. The second factor that is critical to the amount of heat transfer between the food and the structure is the contact area. From the conduction equation the amount of heat transferred between two items at different temperatures that are in contact is directly dependent on the area of contact. When a food product and structure are in contact with each other through a limited area the heat transfer is reduced. So, the area of direct contact with the metallic structure compared to the total potential area of contact is critical. Conveyor belts have different designs. The different designs will affect both the weight of the belt and its ability to absorb heat and the % area of the belt in contact with the food which affects the ability to transfer heat from the food directly to the structure of the belt. The conduction cooling factor is a calculated term that takes these two important factors for heat transfer into account. As stated above, the "belt weight in food contact" is the weight of the portion of the belt (being one or more than one plate, as the case may be) that is in actual physical contact with the piece of food product, and the "belt % contact area" is the portion of the piece of food product that is in contact with the top surface 42 of one or more plates, which is calculated as described hereinabove. Most mesh or flat wire conveyor belts have a conduction cooling factor significantly less than 1.0 pounds per square foot. They are not very effective at contact cooling due to low belt weight in contact and low % contact area. Typically, the conduction cooling factor that characterizes the present invention is higher than 1.0 pound per square foot, preferably at least 2.5 pounds per square foot, and more preferably at least 3.0 pounds per square foot. Optimally the conduction cooling factor employed in the practice of the present invention is 2.0 to 4.0 pounds per square foot.

There is a limit to the thickness of the plates to enhance the conduction cooling factor. Thicker plates with a higher weight and heat capacity could be used but will result in higher belt weight and drive tensions and may lower the belt life. Lower belt weights can also be used but should have a reduced crusting capacity due to lower weight and stored refrigeration capacity in the metal. A plate thickness of 0.03 in to 0.15 in provides a good balance between plate strength, belt weight, and crusting capacity. Plates outside of this range can also be used but plates less than 0.03 in thick will have lower structural strength and durability and plates thicker than 0.15 in will have higher belt weights, be more expensive, and be more difficult to drive.

In operation, this invention can crust freeze the bottom of products placed on the belt 11. Cryogen is applied out of nozzles 22 to the top surface 32 and to the bottom surface 33 of the plate forming upper portion 31 of belt 11. Cryogen is preferably also applied to the surfaces of the return portion of belt 11. The direct contact of the cold metal plate with the food product 30 quickly forms a frozen layer on the bottom of the food product. There is a transfer of heat from the food product 30 to the plate that is in contact with the food product, due to the large temperature difference and the contact between the cold metal plates forming the belt and the warmer food product.

Preferably, the temperature difference between the temperature of the piece of food product when it is first placed on the plate belt, and the temperature of the top surface of the plate belt onto which the piece of food product is first placed, is at least 100 degrees F., preferably 100 to 400 degrees F., and more preferably 150 to 250 degrees F. This contact provides direct conduction heat transfer from the food product 30 without the need for fans or gas velocity over the product. The capacity of the plate to store refrigeration depends on the temperature of the plate and the volume of the plate. The lower the temperature the more heat can be absorbed from the food. The higher the volume and mass of the plate the more heat can be absorbed from the food.

Segments, such as segment 45 as shown in FIG. 6 with its ninety-degree bend in each plate, serve two functions. First, they provide a higher surface area (a fin) for each plate so that convection cooling from under the belt is more effective at keeping the plates cold. Second, they provide additional mass to each plate so as to provide a higher heat capacity for cooling. As food is placed on the top belt at the freezer entrance the cold plates absorb heat from the food and the plates begin to warm up. As the plates travel through the freezer, their surfaces are chilled by the cold gas circulation from fans above and below the belt, and from direct cryogen spray onto the belt.

At the end of the freezer opposite the end into which the food product was fed, the product is removed from the belt and the belt loops back into the freezer. The plates comprising the return portion of the belt are cooled back to the freezer operation temperature by fan driven gas flow and by cryogen spray below the top belt. This is illustrated in FIG. 3. The fan driven gas flow can also be directed both between the top and bottom return belt and also below the bottom return belt and the floor of the freezer. This flow will provide convection cooling of the bottom return belt and the underside of the top belt. It can also provide flow on the floor of the freezer to prevent buildup of any liquid cryogen. The aforementioned partitions 45, if present, direct the flow underneath the top belt and along the floor as shown in FIG. 3. The preferred direction of flow from the blades of fans 24 is pulling vapor from the belt and pushing it toward the top region. The vapor flow can also be operated in the other direction instead, where cold vapor is pushed down onto the belt and vapor is pulled away from the ceiling. There can be high velocity vapor exiting the freezer at the entrance and exit that is not picked up by the gas exhaust system used on cryogenic freezers. In general, the vapor flow and cryogen injection system are implemented with the purpose of keeping the belt cold and providing direct convection cooling of the food product.

For optimal performance, the top surfaces of the plates forming the belt should be cooled down to and maintained at a temperature of −80° F. or lower (colder), preferably −150° F. or lower, and more preferably-80° to −320° F. This temperature is established and maintained by contacting the belt surface with cryogen injected from the aforementioned nozzles 22 to the top surface of the belt and preferably also to the bottom surface of the upper portion of the belt, and more preferably also to the top surface and bottom surface of the return portion of the belt. Preferably, the plates on belt 11 are maintained at the operating temperature of within the freezer even at the openings 8 and 9 of the freezer.

This freezing process disclosed uses a solid metal segmented belt of stainless steel or other metal, at a very low temperature that has a much higher heat capacity and thermal conductivity for crust freezing the bottom of a product placed on the belt than other conveyor belt options. The bottom cooling is primarily from direct product contact with the cold plates. Top cooling is from the convective cold gas flow over the product. When a food product (especially raw product such as raw meat) is placed on the belt, the low plate temperature and the heat capacity of the belt (as provided by the plates of high mass) very quickly crust freezes the bottom of the product. This solid conduction contact cooling of the bottom of the product is the primary mode of heat transfer in this freezer compared to gas convection cooling in most other freezers. The low temperature of the plates provides a nearly nonstick surface so that there is no damage to or yield loss from the bottom of the product as it exits the freezer and is removed from the belt. The additional material in the segments 45 also provide additional heat capacity for cooling the product. As product is placed on the belt the areas where the product touches the plate will warm up as heat flows into the plate. Because the plate is metal with a high thermal conductivity the heat is quickly transferred to the colder areas of the plate including the bent section. The segments also provide additional surface area to the plates, for convection cooling of the plates by gas flow underneath the belt similar to the effect of a fin on a heat exchanger.

The invention described herein can deliver heat removal from the food product pieces at an average rate of 890 Btu/hour across a typical 15-second time frame, with an initial cooling rate of greater than about 6,000 Btu/hour, a key feature to setting the surface of the product and creating a crust without sticking. The initial cooling rate is driven by the contact and the thermowell effect of the relatively thick plate metal, while the plate including the aforementioned extending segments serves to continue to drive high conduction rates through the contact period in which the food product is in contact with the plate.

The present invention provides a significantly higher belt weight in contact with the bottom of the food product, preferably at least 2 to 4 pounds per square foot. This additional weight and close contact provide significantly higher stored refrigeration capacity for bottom crusting when the belt is cooled to low temperatures. When the belt is cooled to cryogenic temperatures this stored heat capacity enables a very fast crust freeze on the bottom of products contacting the belt and provides superior nonstick performance so that product does not stick to this belt and produce product damage and yield loss.

EXAMPLE 1

A freezer with a belt width of 42 inches has a base belt density of 4.56 pounds per foot, plates weighing 12.46 pounds per foot, for a total belt weight of 17.02 pounds per foot. The weight in contact with the food is 12.46 pounds per foot. For a 42 in wide belt this is a belt weight in contact with the food of 3.56 pounds per square foot. The belt has an open area between plates equal to 5.8% and therefore a belt % contact area of 94.2%. For this belt the conduction cooling factor is calculated to be 3.35 pounds per square foot.

EXAMPLE 2

The higher weight and higher heat capacity that characterize the plates and belts used in the present invention also permit achieving a thicker frozen layer on the bottom of raw food product. For example, a conveyor belt exhibiting a contact weight of 3.353 pounds per square foot at a contact weight of 0.57 pounds per piece of product (raw chicken breast), is assumed to warm from −145 F to −90 F when the raw chicken breast is placed on the belt. The chicken breast is 3.5 in wide by 7.0 in long and its density was 71.8 pounds per cubic foot. The raw chicken is assumed to be frozen when it is cooled from 45 F to 0 F and 110 btu/lb of heat has been removed. The change in heat was 8.3 BTU. The amount of product frozen to OF was 0.08 pounds and the volume frozen to 0 F was 1.81 cubic inches. The layer thickness frozen to OF was 1.87 mm.

Advantages

The present invention provides numerous distinctions relative to prior practice. These distinctions lead to many advantages.

Conduction based bottom crusting due to stored refrigeration of the belt contact material combined with convection based top crusting, leads to:
1.) Higher bottom cooling rates than typical freezers that use gas convection approaches.
2.) Much higher contact weight of the belt to the food product.
3.) Much higher heat capacity of the belt in contact with the product
4.) Significantly shorter freezer lengths with short dwell times for bottom crusting
5.) Improved belt sanitation due to elimination of wire mesh
6.) More cryogen (e.g. liquid nitrogen) injection under the top belt to optimize the belt cooling
7.) Much higher air velocities under the belt to optimize the belt cooling
8.) No plastic waste generated
9.) More efficient cryogen usage and lower cryogen operation cost when bottom crusting with minimal top cooling
10.) The freezer vapor flow and liquid injection is optimized to keep the conveyor belt plates cold and cool the other parts of the product not contacting the plates.
11.) Reverse fan direction is effective at controlling exhaust vapor
12.) Belt marks on the frozen product, product damage, and yield loss, are reduced or eliminated.
13.) Minimal product sticking and adhesion to the conveyor belt.

Compared to previous bottom crusting techniques:
1.) Superior contact cooling performance due to higher belt weight and higher contact area.
2.) Faster bottom crusting due to the higher heat transfer provide higher production capacities per unit length of the freezer.
3.) The higher heat transfer rate for bottom crusting means shorter dwell times are required to fully crust the bottom of the product. This shorter time leads to shorter freezers with a lower equipment capital cost.
4.) Better sanitation. The lack of the wire mesh as the product support surface for the belt is a significant improvement in the sanitary design of the belt. The thin wire mesh that is tightly wound around the rods and supports the product has many areas of overlapping metal that are difficult to inspect and clean. The removal of this mesh and replacement with flat and easy to access stainless steel plates is a major improvement in the ability to clean and sanitize this conveyor design. At the entrance and exit of the freezer where the belt goes around the sprockets of the roller, gaps open up between the plates that allow material to be effectively washed out between the plates. A header with spray nozzles for applying a cleaning solution can be added at these locations.

5.) Lower yield loss due to nonstick surface. The smooth ultra-cold surfaces of the newly disclosed design provide for better release of the product from the belt at the end of the freezer. This means that fewer pieces of product get stuck to the belt and pulled off at the freezer exit. This provides a lower yield loss or product from this belt design and freezing process. The radiused bend on the belts leading edge makes for a very smooth interface to the scrapper bar for removing product at the exit of the freezer.

6.) No plastic waste and down time associated with changing rolls and rethreading the film if it tears during operation 7.) Minimized belt marks on bottom of product 8.) Lower operating cost when bottom crusting only with short dwell times. Much lower operating cost compared to existing cryogenic options. This is due to only removing heat from the bottom of the food product. A typical bottom crust for a raw meat product can be achieved with 15-20 btu/lb of heat removal. Crusting the entire surface of the product will require 35-40 btu/lb. This is especially true for immersion freezers where the whole surface is crusted and the efficiency of liquid nitrogen usage is poor.

9.) Lower capital cost. For a given product, the production capacity of this new belt and freezing process will be much higher per foot of freezer length. This translates into a much shorter freezer with a lower capital cost to meet the production needs.

10.) No plastic film to purchase and no solid waste to dispose of when compared to film freezers.

What is claimed is:

1. A method of freezing the bottom surface of a food product, comprising
placing the food product onto the upper portion of a movable endless conveyor belt;
moving the conveyor belt with the food product on the conveyor belt through an enclosure while applying cryogen in the enclosure to withdraw heat from the food product and from the belt and freeze the surface of the food product that is in contact with the top surface of the belt without freezing said surface of the food product to the top surface of the belt;
wherein the belt has edges oriented in the direction of movement of the belt, said upper portion having a top surface and a bottom surface, wherein the belt is comprised of separate plates each of which is a unitary piece of metal having a thermal conductivity of 2.5 Btu/(Hr-Ft-F)] to 15 [Btu/(Hr-Ft-F)] and a heat capacity of 0.02 Btu/(Lb-F) to 0.19 Btu/(Lb-F) and each of which extends across the belt from one of its edges to the other edge, wherein each plate has a top surface and a bottom surface, and the top surfaces of said plates form together said top surface of the belt;
wherein at least 90% of the surface area of the food product that is within the outermost circumference of the food product which is in contact with the top surface of the conveyor belt is in contact with said top surface of one or more of said plates; and
wherein said belt has a conduction cooling factor of 1 pound per square foot to 5 pounds per square foot.

2. A method according to claim 1 wherein said applying cryogen in the enclosure includes applying cryogen to the food product.

3. A method according to claim 1 wherein said applying cryogen in the enclosure includes applying cryogen to the top surface.

4. A method according to claim 1 wherein said applying cryogen in the enclosure includes applying cryogen to the bottom surface of the upper portion of the belt with which the food product is in contact.

5. A method according to claim 1 wherein at least 95% of the surface area of the food product that is within the outermost circumference of the food product which is in contact with the top surface of the conveyor belt is in contact with said top surface.

6. A method according to claim 1 wherein said enclosure is a tunnel.

7. A method according to claim 1 wherein the belt moves through the enclosure in a path a portion of which is helical.

8. A method according to claim 1 wherein said belt has a conduction cooling factor of 2 to 4 pounds per square foot.

9. A method according to claim 1 wherein a plurality of pairs of adjacent plates are in contact with each other or are separated by a gap that is no larger than 10% of the combined distance across the top surfaces of both of said adjacent plates measured in the direction of movement of the belt.

10. A method according to claim 9 wherein each pair of adjacent plates are in contact with each other or are separated by a gap that is no larger than 10% of the combined distance across the top surfaces of both of said adjacent plates measured in the direction of movement of the belt.

11. A method according to claim 1 wherein the enclosure is a tunnel that has an interior partition above the upper portion of the belt that defines a flow path of gaseous atmosphere within the tunnel from a region above the partition and through space between the partition and the top surface of the upper portion of the belt and back to the region above the partition, and that defines a flow path of gaseous atmosphere from the region above the partition through a return space and back to the region above the partition, and wherein one or more fans are present in the tunnel that are oriented to impel gaseous atmosphere within the tunnel through both of said flow paths.

12. A method according to claim 1 wherein a plurality of the plates that comprise the belt are in the form of a rectangular prism that includes front, rear, and side surfaces, together with said top and bottom surfaces, and that has structure which protrudes from said front surface, from said rear surface, or from said bottom surface, of said rectangular prism.

13. A method according to claim 1 wherein the difference between the temperature of the food product when it is placed on said top portion of the belt and the temperature of said top portion onto which the food product is placed is at least 100° F.

14. A method according to claim 1 wherein the difference between the temperature of the food product when it is placed on said top portion of the belt and the temperature of said top portion onto which the food product is placed is 100° F. to 400° F.

15. A method according to claim 1 wherein the temperature of the top surface of the plate onto which the food product is placed is less than 32° F. and is less than the temperature of the food product.

* * * * *